US 007142106B2

(12) United States Patent
Scoggins

(10) Patent No.: US 7,142,106 B2
(45) Date of Patent: Nov. 28, 2006

(54) SYSTEM AND METHOD OF VISUALIZING NETWORK LAYOUT AND PERFORMANCE CHARACTERISTICS IN A WIRELESS NETWORK

(75) Inventor: Sean M. Scoggins, Raleigh, NC (US)

(73) Assignee: Elster Electricity, LLC, Raleigh, NC (US)

(*) Notice: Subject to any disclaimer, the term of this patent is extended or adjusted under 35 U.S.C. 154(b) by 145 days.

(21) Appl. No.: 10/868,100

(22) Filed: Jun. 15, 2004

(65) Prior Publication Data

US 2005/0278440 A1 Dec. 15, 2005

(51) Int. Cl.
*G08B 19/00* (2006.01)
(52) U.S. Cl. .................. 340/522; 340/506; 340/825.36; 340/825.49
(58) Field of Classification Search ................ 340/522, 340/506, 524, 525, 825.36, 825.49
See application file for complete search history.

(56) References Cited

U.S. PATENT DOCUMENTS

| | | | | |
|---|---|---|---|---|
| 3,445,815 A | 5/1969 | Saltzberg et al. | ........... | 340/163 |
| 3,858,212 A | 12/1974 | Tompkins et al. | .... | 343/100 CS |
| 3,878,512 A | 4/1975 | Kobayashi et al. | ..... | 340/168 R |
| 3,973,240 A | 8/1976 | Fong | ........................... | 340/151 |
| 4,031,513 A | 6/1977 | Simciak | ................... | 340/152 T |
| 4,056,107 A | 11/1977 | Todd et al. | ..................... | 130/27 |
| 4,066,964 A | 1/1978 | Costanza et al. | ............. | 325/55 |
| 4,132,981 A | 1/1979 | White | ......................... | 340/203 |
| 4,190,800 A | 2/1980 | Kelly, Jr. et al. | ............. | 325/37 |
| 4,204,195 A | 5/1980 | Bogacki | ...................... | 340/151 |
| 4,218,737 A | 8/1980 | Buscher et al. | ............. | 364/493 |
| 4,250,489 A | 2/1981 | Dudash et al. | .............. | 340/147 |
| 4,254,472 A | 3/1981 | Juengel et al. | .............. | 364/900 |
| 4,319,358 A | 3/1982 | Sepp | .............................. | 375/1 |
| 4,321,582 A | 3/1982 | Banghart | ..................... | 340/310 |
| 4,322,842 A | 3/1982 | Martinez | ..................... | 370/204 |
| 4,328,581 A | 5/1982 | Harmon et al. | ................. | 371/8 |
| 4,361,851 A | 11/1982 | Asip et al. | ..................... | 358/84 |
| 4,361,890 A | 11/1982 | Green, Jr. et al. | .............. | 375/1 |
| 4,396,915 A | 8/1983 | Farnsworth et al. | ... | 340/870.03 |
| 4,405,829 A | 9/1983 | Rivest et al. | ............ | 178/22.14 |
| 4,415,896 A | 11/1983 | Allgood | ................. | 340/870.03 |
| 4,466,001 A | 8/1984 | Moore et al. | .......... | 340/825.08 |
| 4,504,831 A | 3/1985 | Jahr et al. | .............. | 340/870.03 |
| 4,506,386 A | 3/1985 | Ichikawa et al. | ........... | 455/343 |
| 4,513,415 A | 4/1985 | Martinez | ..................... | 370/92 |
| 4,525,861 A | 6/1985 | Freeburg | ..................... | 455/33 |

(Continued)

FOREIGN PATENT DOCUMENTS

CH 682196 A5 7/1993

(Continued)

OTHER PUBLICATIONS

Desbonnet, Joe et al., "Systems Architecture and Implementation of CEBus/Internet Gateway", *IEEE*, 1997, 1057-1062.

(Continued)

*Primary Examiner*—Daryl C Pope
(74) *Attorney, Agent, or Firm*—Woodcock Washburn LLP

(57) ABSTRACT

A system for visually detailing the layout of a wireless network and for providing performance statistics regarding the network. Graphical diagrams are generated in accordance with a request wherein the diagrams illustrate nodes and data collectors in the wireless network. The nodes record data related to a commodity usage and transmit the data to the collectors, which in turn transmit aggregated data from a plurality of nodes to a central data collection server.

20 Claims, 5 Drawing Sheets

U.S. PATENT DOCUMENTS

| | | | | |
|---|---|---|---|---|
| 4,600,923 A | 7/1986 | Hicks et al. | ............. | 340/870.2 |
| 4,608,699 A | 8/1986 | Batlivala et al. | ............. | 375/216 |
| 4,611,333 A | 9/1986 | McCallister et al. | ........... | 375/1 |
| 4,614,945 A | 9/1986 | Brunius et al. | ........ | 340/870.03 |
| 4,617,566 A | 10/1986 | Diamond | ............... | 340/870.11 |
| 4,628,313 A | 12/1986 | Gombrich et al. | ..... | 340/870.02 |
| 4,631,538 A | 12/1986 | Carreno | ............... | 340/870.18 |
| 4,638,298 A | 1/1987 | Spiro | ...................... | 340/827 |
| 4,644,321 A | 2/1987 | Kennon | ..................... | 340/310 |
| 4,653,076 A | 3/1987 | Jerrim et al. | ............... | 375/115 |
| 4,672,555 A | 6/1987 | Hart et al. | .................. | 700/276 |
| 4,680,704 A | 7/1987 | Konicek et al. | ............ | 364/525 |
| 4,688,038 A | 8/1987 | Giammarese | .......... | 340/870.02 |
| 4,692,761 A | 9/1987 | Robinton | .................. | 340/825 |
| 4,707,852 A | 11/1987 | Jahr et al. | ................... | 379/107 |
| 4,713,837 A | 12/1987 | Gordon | ....................... | 379/93 |
| 4,724,435 A | 2/1988 | Moses et al. | .......... | 340/870.13 |
| 4,728,950 A | 3/1988 | Hendrickson et al. | . | 340/870.31 |
| 4,734,680 A | 3/1988 | Gehman et al. | ............ | 340/539 |
| 4,749,992 A | 6/1988 | Fitzemeyer et al. | ... | 340/870.02 |
| 4,757,456 A | 7/1988 | Benghiat | ..................... | 364/464 |
| 4,769,772 A | 9/1988 | Dwyer | ......................... | 364/300 |
| 4,783,748 A | 11/1988 | Swarztrauber et al. | ...... | 364/483 |
| 4,792,946 A | 12/1988 | Mayo | .......................... | 370/338 |
| 4,799,059 A | 1/1989 | Grindahl et al. | ........ | 340/870.03 |
| 4,804,938 A | 2/1989 | Rouse et al. | ................. | 340/310 |
| 4,827,514 A | 5/1989 | Ziolko et al. | .................. | 380/48 |
| 4,839,645 A | 6/1989 | Lill | ............................ | 340/870.17 |
| 4,841,545 A | 6/1989 | Endo et al. | ....................... | 375/1 |
| 4,860,379 A | 8/1989 | Schoeneberger et al. | ....... | 455/5 |
| 4,862,493 A | 8/1989 | Venkataraman et al. | .... | 379/107 |
| 4,868,877 A | 9/1989 | Fischer | ......................... | 380/25 |
| 4,884,021 A | 11/1989 | Hammond et al. | ......... | 324/142 |
| 4,912,722 A | 3/1990 | Carlin | ........................... | 375/1 |
| 4,922,518 A | 5/1990 | Gordon et al. | ................ | 379/57 |
| 4,939,726 A | 7/1990 | Flammer et al. | ............ | 370/94.1 |
| 4,940,974 A | 7/1990 | Sojka | ...................... | 340/825.08 |
| 4,940,976 A | 7/1990 | Gastouniotis et al. | .. | 340/870.02 |
| 4,958,359 A | 9/1990 | Kato | ................................ | 375/1 |
| 4,964,138 A | 10/1990 | Nease et al. | .................... | 375/1 |
| 4,965,533 A | 10/1990 | Gilmore | ........................ | 331/18 |
| 4,972,507 A | 11/1990 | Lusignan | ........................ | 455/51 |
| 5,007,052 A | 4/1991 | Flammer | .................... | 370/85.6 |
| 5,018,165 A | 5/1991 | Sohner et al. | .................. | 375/1 |
| 5,022,046 A | 6/1991 | Morrow, Jr. | .................... | 375/1 |
| 5,032,833 A | 7/1991 | Laporte | ................. | 340/825.02 |
| 5,053,766 A | 10/1991 | Ruiz-del-Portal et al. | ................... | 340/870.02 |
| 5,053,774 A | 10/1991 | Schuermann et al. | ......... | 342/44 |
| 5,056,107 A | 10/1991 | Johnson et al. | ................. | 375/1 |
| 5,067,136 A | 11/1991 | Arthur et al. | .................... | 375/1 |
| 5,079,715 A | 1/1992 | Venkataraman et al. | .... | 364/481 |
| 5,079,768 A | 1/1992 | Flammer | ................... | 370/94.1 |
| 5,086,292 A | 2/1992 | Johnson et al. | ............. | 340/637 |
| 5,086,385 A | 2/1992 | Launey | ........................ | 364/188 |
| 5,090,024 A | 2/1992 | Vander Mey et al. | .......... | 375/1 |
| 5,111,479 A | 5/1992 | Akazawa | ....................... | 375/1 |
| 5,115,433 A | 5/1992 | Baran et al. | ................. | 370/94.3 |
| 5,115,448 A | 5/1992 | Mori | ............................ | 375/1 |
| 5,129,096 A | 7/1992 | Burns | ............................ | 455/18 |
| 5,130,987 A | 7/1992 | Flammer | .................... | 370/103 |
| 5,132,985 A | 7/1992 | Hashimoto et al. | ............ | 375/1 |
| 5,136,614 A | 8/1992 | Hiramatsu et al. | ............ | 375/1 |
| 5,142,694 A | 8/1992 | Jackson et al. | ............ | 455/67.1 |
| 5,151,866 A | 9/1992 | Glaser et al. | ................ | 364/483 |
| 5,155,481 A | 10/1992 | Brennan, Jr. et al. | ... | 340/870.02 |
| 5,160,926 A | 11/1992 | Schweitzer, III | ....... | 340/870.02 |
| 5,166,664 A | 11/1992 | Fish | ............................ | 340/539 |
| 5,177,767 A | 1/1993 | Kato | ................................ | 375/1 |
| 5,179,376 A | 1/1993 | Pomatto | ..................... | 340/870.02 |
| 5,189,694 A | 2/1993 | Garland | ....................... | 379/106 |
| 5,194,860 A | 3/1993 | Jones et al. | ............. | 340/370.02 |
| 5,197,095 A | 3/1993 | Bonnett | ......................... | 379/107 |
| 5,204,877 A | 4/1993 | Endo et al. | ....................... | 375/1 |
| 5,214,587 A | 5/1993 | Green | .................... | 364/464.04 |
| 5,225,994 A | 7/1993 | Arinobu et al. | ............... | 364/492 |
| 5,228,029 A | 7/1993 | Kotzin | ........................ | 370/95.1 |
| 5,229,996 A | 7/1993 | Bäckström et al. | ....... | 370/100.1 |
| 5,239,575 A | 8/1993 | White et al. | .................. | 379/107 |
| 5,239,584 A | 8/1993 | Hershey et al. | ............... | 380/28 |
| 5,243,338 A | 9/1993 | Brennan, Jr. et al. | ... | 340/870.02 |
| 5,252,967 A | 10/1993 | Brennan et al. | ........ | 340/870.02 |
| 5,260,943 A | 11/1993 | Comroe et al. | ............ | 370/95.1 |
| 5,270,704 A | 12/1993 | Quintana et al. | ....... | 340/870.02 |
| 5,280,498 A | 1/1994 | Tymes et al. | ................... | 375/1 |
| 5,280,499 A | 1/1994 | Suzuki | ........................... | 375/1 |
| 5,285,469 A | 2/1994 | Vanderpool | .................... | 375/1 |
| 5,287,287 A | 2/1994 | Chamberlain et al. | ....... | 364/483 |
| 5,289,497 A | 2/1994 | Jacobson et al. | ............... | 375/1 |
| 5,295,154 A | 3/1994 | Meier et al. | .................... | 375/1 |
| 5,307,349 A | 4/1994 | Shloss et al. | .............. | 370/85.2 |
| 5,311,541 A | 5/1994 | Sanderford, Jr. | ................ | 375/1 |
| 5,311,542 A | 5/1994 | Eder | ................................ | 375/1 |
| 5,315,531 A | 5/1994 | Oravetz et al. | ............. | 364/550 |
| 5,319,679 A | 6/1994 | Bagby | ........................ | 375/106 |
| 5,329,547 A | 7/1994 | Ling | ................................ | 375/1 |
| 5,345,225 A | 9/1994 | Davis | ......................... | 340/635 |
| 5,359,625 A | 10/1994 | Vander Mey et al. | ........... | 375/1 |
| 5,377,222 A | 12/1994 | Sanderford, Jr. | ................ | 375/1 |
| 5,381,462 A | 1/1995 | Larson et al. | ................ | 379/107 |
| 5,383,134 A | 1/1995 | Wrzesinski | ................... | 364/514 |
| 5,384,712 A | 1/1995 | Oravetz et al. | ............. | 364/550 |
| 5,387,873 A | 2/1995 | Muller et al. | ................ | 327/155 |
| 5,390,360 A | 2/1995 | Scop et al. | ................ | 455/34.2 |
| 5,406,495 A | 4/1995 | Hill | .............................. | 364/483 |
| 5,416,917 A | 5/1995 | Adair et al. | ................. | 395/500 |
| 5,420,799 A | 5/1995 | Peterson et al. | ............ | 364/483 |
| 5,428,636 A | 6/1995 | Meier | ......................... | 375/202 |
| 5,430,759 A | 7/1995 | Yokev et al. | ............... | 375/202 |
| 5,432,507 A | 7/1995 | Mussino et al. | ........ | 340/870.03 |
| 5,432,815 A | 7/1995 | Kang et al. | .................. | 375/200 |
| 5,438,329 A | 8/1995 | Gastouniotis et al. | .. | 340/870.02 |
| 5,448,230 A | 9/1995 | Schanker et al. | ....... | 340/870.03 |
| 5,448,570 A | 9/1995 | Toda et al. | ................. | 370/95.3 |
| 5,450,088 A | 9/1995 | Meier et al. | ................... | 342/51 |
| 5,452,465 A | 9/1995 | Geller et al. | ................. | 395/800 |
| 5,455,533 A | 10/1995 | Köllner | ....................... | 327/484 |
| 5,455,544 A | 10/1995 | Kechkaylo | ................... | 332/103 |
| 5,455,569 A | 10/1995 | Sherman et al. | ........ | 340/825.02 |
| 5,455,822 A | 10/1995 | Dixon et al. | ..................... | 370/18 |
| 5,457,713 A | 10/1995 | Sanderford, Jr. et al. | ... | 375/206 |
| 5,461,558 A | 10/1995 | Patsiokas et al. | ............ | 364/145 |
| 5,463,657 A | 10/1995 | Rice | ............................ | 375/200 |
| 5,473,322 A | 12/1995 | Carney | ..................... | 340/870.02 |
| 5,475,742 A | 12/1995 | Gilbert | ........................ | 379/106 |
| 5,475,867 A | 12/1995 | Blum | ......................... | 455/53.1 |
| 5,479,442 A | 12/1995 | Yamamoto | ................... | 375/206 |
| 5,481,259 A | 1/1996 | Bane | ...................... | 340/870.03 |
| 5,488,608 A | 1/1996 | Flammer, III | ............ | 370/85.13 |
| 5,491,473 A | 2/1996 | Gilbert | ........................ | 340/870.01 |
| 5,493,287 A | 2/1996 | Ane | ............................ | 340/825.52 |
| 5,495,239 A | 2/1996 | Ouellette | ............... | 340/870.02 |
| 5,497,424 A | 3/1996 | Vanderpool | ................. | 380/34 |
| 5,499,243 A | 3/1996 | Hall | ........................... | 370/85.8 |
| 5,500,871 A | 3/1996 | Kato et al. | .................. | 375/208 |
| 5,511,188 A | 4/1996 | Pascucci et al. | ............. | 395/600 |
| 5,519,388 A | 5/1996 | Adair, Jr. | ................. | 340/870.02 |
| 5,521,910 A | 5/1996 | Matthews | .................... | 370/54 |
| 5,522,044 A | 5/1996 | Pascucci et al. | ....... | 395/200.06 |
| 5,524,280 A | 6/1996 | Douthitt et al. | ................. | 455/62 |
| 5,525,898 A | 6/1996 | Lee, Jr. et al. | ............... | 324/142 |
| 5,526,389 A | 6/1996 | Buell et al. | .................. | 375/200 |
| 5,528,507 A | 6/1996 | McNamara et al. | ............ | 364/483 |
| 5,528,597 A | 6/1996 | Gerszberg et al. | ......... | 370/95.3 |

| Patent | Date | Inventor | Class |
|---|---|---|---|
| 5,539,775 A | 7/1996 | Tuttle et al. | 375/200 |
| 5,541,589 A | 7/1996 | Delaney | 340/870.02 |
| 5,544,036 A | 8/1996 | Brown, Jr. et al. | 364/145 |
| 5,546,424 A | 8/1996 | Miyake | 375/206 |
| 5,548,527 A | 8/1996 | Hemminger et al. | 364/492 |
| 5,548,633 A | 8/1996 | Kujawa et al. | 379/93 |
| 5,553,094 A | 9/1996 | Johnson et al. | 375/200 |
| 5,555,508 A | 9/1996 | Munday et al. | 364/492 |
| 5,559,870 A | 9/1996 | Patton et al. | 379/144 |
| 5,566,332 A | 10/1996 | Adair et al. | 395/600 |
| 5,570,084 A | 10/1996 | Ritter et al. | 340/825.05 |
| 5,572,438 A | 11/1996 | Ehlers et al. | 364/492 |
| 5,574,657 A | 11/1996 | Tofte | 364/510 |
| 5,590,179 A | 12/1996 | Shincovich et al. | 379/107 |
| 5,592,470 A | 1/1997 | Rudrapatna et al. | 370/320 |
| 5,594,740 A | 1/1997 | LaDue | 379/59 |
| 5,602,744 A | 2/1997 | Meek et al. | 364/464.22 |
| 5,617,084 A | 4/1997 | Sears | 331/176 |
| 5,619,192 A | 4/1997 | Ayala | 340/870.02 |
| 5,619,685 A | 4/1997 | Schiavone | 395/500 |
| 5,621,629 A | 4/1997 | Hemminer et al. | 363/56 |
| 5,627,759 A | 5/1997 | Bearden et al. | 364/483 |
| 5,631,636 A | 5/1997 | Bane | 340/825.69 |
| 5,636,216 A | 6/1997 | Fox et al. | 370/402 |
| 5,640,679 A | 6/1997 | Lundqvist et al. | 455/33.2 |
| 5,659,300 A | 8/1997 | Dresselhuys et al. | 340/870.02 |
| 5,668,803 A | 9/1997 | Tymes et al. | 370/312 |
| 5,668,828 A | 9/1997 | Sanderford, Jr. et al. | 375/202 |
| 5,673,252 A | 9/1997 | Johnson et al. | 370/449 |
| 5,684,472 A | 11/1997 | Bane | 340/870.02 |
| 5,684,799 A | 11/1997 | Bigham et al. | 370/397 |
| 5,691,715 A | 11/1997 | Ouellette | 340/870.09 |
| 5,692,180 A | 11/1997 | Lee | 395/610 |
| 5,696,501 A | 12/1997 | Ouellette et al. | 340/870.02 |
| 5,696,765 A | 12/1997 | Safadi | 370/436 |
| 5,699,276 A | 12/1997 | Roos | 364/514 A |
| 5,714,931 A | 2/1998 | Petite et al. | 340/539 |
| 5,715,390 A | 2/1998 | Hoffman et al. | 395/188.01 |
| 5,717,604 A | 2/1998 | Wiggins | 364/514 C |
| 5,719,564 A | 2/1998 | Sears | 340/870.02 |
| 5,732,078 A | 3/1998 | Arango | 370/355 |
| 5,745,901 A | 4/1998 | Entner et al. | 707/103 |
| 5,748,104 A | 5/1998 | Argyroudis et al. | 340/870.11 |
| 5,748,619 A | 5/1998 | Meier | 370/278 |
| 5,751,914 A | 5/1998 | Coley et al. | 395/51 |
| 5,751,961 A | 5/1998 | Smyk | 395/200.47 |
| 5,754,772 A | 5/1998 | Leaf | 395/200.33 |
| 5,754,830 A | 5/1998 | Butts et al. | 395/500 |
| 5,757,783 A | 5/1998 | Eng et al. | 370/315 |
| 5,768,148 A | 6/1998 | Murphy et al. | 364/492 |
| 5,778,368 A | 7/1998 | Hogan et al. | 707/10 |
| 5,787,437 A | 7/1998 | Potterveld et al. | 707/103 |
| 5,790,789 A | 8/1998 | Suarez | 395/200.32 |
| 5,790,809 A | 8/1998 | Holmes | 395/200.58 |
| 5,801,643 A | 9/1998 | Williams et al. | 340/870.02 |
| 5,805,712 A | 9/1998 | Davis | 380/50 |
| 5,808,558 A | 9/1998 | Meek et al. | 340/870.01 |
| 5,809,059 A | 9/1998 | Souissi et al. | 375/202 |
| 5,822,521 A | 10/1998 | Gartner et al. | 395/200.6 |
| 5,850,187 A | 12/1998 | Carrender et al. | 340/10.42 |
| 5,862,391 A | 1/1999 | Salas et al. | 395/750.01 |
| 5,872,774 A | 2/1999 | Wheatley, III et al. | 370/335 |
| 5,874,903 A | 2/1999 | Shuey et al. | 340/870.02 |
| 5,875,183 A | 2/1999 | Nitadori | 370/328 |
| 5,875,402 A | 2/1999 | Yamawaki | 455/452 |
| 5,884,184 A | 3/1999 | Sheffer | 455/521 |
| 5,892,758 A | 4/1999 | Argyroudis | 370/335 |
| 5,896,382 A | 4/1999 | Davis et al. | 370/401 |
| 5,897,607 A | 4/1999 | Jenney et al. | 702/62 |
| 5,898,387 A | 4/1999 | Davis et al. | 340/870.02 |
| 5,907,540 A | 5/1999 | Hayashi | 370/315 |
| 5,910,799 A | 6/1999 | Carpenter et al. | 345/333 |
| 5,923,269 A | 7/1999 | Shuey et al. | 340/870.02 |
| 5,926,103 A | 7/1999 | Petite | 340/825.19 |
| 5,926,531 A | 7/1999 | Petite | 379/144 |
| 5,943,375 A | 8/1999 | Veintimilla | 375/355 |
| 5,944,842 A | 8/1999 | Propp et al. | 714/701 |
| 5,953,319 A | 9/1999 | Dutta et al. | 370/238 |
| 5,959,550 A | 9/1999 | Giles | 340/870.02 |
| 5,960,074 A | 9/1999 | Clark | 379/310 |
| 5,963,146 A | 10/1999 | Johnson et al. | 340/870.1 |
| 5,974,236 A | 10/1999 | Sherman | 395/200.51 |
| 5,986,574 A | 11/1999 | Colton | 340/870.03 |
| 6,000,034 A | 12/1999 | Lightbody et al. | 713/202 |
| 6,028,522 A | 2/2000 | Petite | 340/641 |
| 6,034,988 A | 3/2000 | VanderMey et al. | 375/202 |
| 6,035,201 A | 3/2000 | Whitehead | 455/455 |
| 6,041,056 A | 3/2000 | Bigham et al. | 370/395 |
| 6,061,604 A | 5/2000 | Russ et al. | 700/90 |
| 6,067,029 A | 5/2000 | Durston | 340/870.03 |
| 6,073,169 A | 6/2000 | Shuey et al. | 709/217 |
| 6,073,174 A | 6/2000 | Montgomerie et al. | 709/224 |
| 6,078,251 A | 6/2000 | Landt et al. | 340/10.41 |
| 6,078,785 A | 6/2000 | Bush | 455/7 |
| 6,078,909 A | 6/2000 | Knutson | 705/59 |
| 6,088,659 A | 7/2000 | Kelley et al. | 702/62 |
| 6,091,758 A | 7/2000 | Ciccone et al. | 375/132 |
| 6,100,817 A | 8/2000 | Mason, Jr. et al. | 340/870.02 |
| 6,112,192 A | 8/2000 | Capek | 705/59 |
| 6,128,276 A | 10/2000 | Agee | 370/288 |
| 6,137,423 A | 10/2000 | Glorioso et al. | 340/870.02 |
| 6,150,955 A | 11/2000 | Tracy et al. | 340/870.02 |
| 6,154,487 A | 11/2000 | Murai et al. | 375/150 |
| 6,160,993 A | 12/2000 | Wilson | 455/12.1 |
| 6,172,616 B1 | 1/2001 | Johnson et al. | 340/870.12 |
| 6,199,068 B1 | 3/2001 | Carpenter | 707/100 |
| 6,208,266 B1 | 3/2001 | Lyons et al. | 340/870.02 |
| 6,218,953 B1 | 4/2001 | Petite | 340/641 |
| 6,233,327 B1 | 5/2001 | Petite | 379/155 |
| 6,246,677 B1 | 6/2001 | Nap et al. | 370/346 |
| 6,249,516 B1 | 6/2001 | Brownrigg et al. | 370/338 |
| 6,363,057 B1 | 3/2002 | Ardalan et al. | 370/252 |
| 6,396,839 B1 | 5/2002 | Ardalan et al. | 370/401 |
| 6,421,731 B1 | 7/2002 | Ciotti, Jr. et al. | 709/238 |
| 6,430,268 B1 | 8/2002 | Petite | 379/39 |
| 6,437,692 B1 | 8/2002 | Petite et al. | 340/540 |
| 6,446,192 B1 | 9/2002 | Narasimhan et al. | 712/29 |
| 6,643,278 B1 | 11/2003 | Panasik et al. | 370/330 |
| 6,684,245 B1 | 1/2004 | Shuey et al. | 709/223 |
| 6,751,563 B1 | 6/2004 | Spanier et al. | 702/61 |
| 6,813,532 B1 * | 11/2004 | Eryurek et al. | 700/108 |
| 6,901,582 B1 * | 5/2005 | Harrison | 717/127 |
| 2001/0002210 A1 | 5/2001 | Petite | 379/155 |
| 2001/0024163 A1 | 9/2001 | Petite | 340/628 |
| 2002/0012323 A1 | 1/2002 | Petite et al. | 370/252 |
| 2002/0013679 A1 | 1/2002 | Petite | 702/188 |
| 2002/0019712 A1 | 2/2002 | Petite et al. | 702/61 |
| 2002/0019725 A1 | 2/2002 | Petite | 702/188 |
| 2002/0027504 A1 | 3/2002 | Davis et al. | 340/540 |
| 2002/0031101 A1 | 3/2002 | Petite et al. | 370/310 |
| 2002/0125998 A1 | 9/2002 | Petite et al. | 340/286.01 |
| 2002/0145537 A1 | 10/2002 | Mueller et al. | 340/870.02 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |
| 2003/0202512 A1 | 10/2003 | Kennedy | 370/389 |
| 2004/0113810 A1 | 6/2004 | Mason, Jr. et al. | 340/870.02 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |

| | | |
|---|---|---|
| GB | 02 222 898 A | 3/1990 |
| GB | 2 237 910 A | 5/1991 |
| JP | 59-229949 | 12/1984 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |

OTHER PUBLICATIONS

Markwalter, Brian et al., "CEBus Network Layer Description", IEEE, 1989, 571-575.

Newton, Harry, Newton's Telecom Dictionary, Flatiron Publishing, Inc. 10th Ed., 1996, LAN (1 of 1): Cebus Overview (1-3): Cebus Industry Council (1 of 1).

Newton, Harry, Newton's Telecom Dictionary, 10th Edition, 1996, 243.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com BellSouth Wireless Data—Paging, Mobitex, Network, Business, Sep. 23, 1998:,—MOBITEX®: The Heart of Every BellSouth Solution,—MOBITEX Features and Services: RAM Mobile Data White Paper, Feb. 1997,—Narrowband PCS Technologies: What are the Options?: RAM Mobile Data White Paper, Nov. 1997,—The Inherent Security of Data Over Mobitex Wireless Packet Data Networks, A RAM Mobile Data White Paper, Oct. 1995,—Comparative Analysis of Coverage and Performance: RAM & Ardis, 1998.

Internet Printout, http://www.ardis.com, "Ardis Two-Way, Wireless Data Communications," ARDIS, Sep. 23, 1998.

Internet Printout, http://ww.ardis.com/RADIO, "An Overview of Radio Coverage," Sep. 29, 1998, "Radio Propagation," Sep. 29, 1998, "Factors Affecting ARDIS Coverage," Sep. 29, 1998, "The ARDIS Network Compared to Other Systems," Sep. 29, 1998.

Internet Printout, http://www.ardis.com/RADIO, "Radio Coverage," Sep. 29, 1998, "Glossary of Terms," Sep. 29, 1998, "Radio Propagation in Free Space," Sep. 29, 1998, "Real World Propagation Variations," Sep. 29, 1998, "Probability of Reception vs. Calculation," Sep. 29, 1998.

"MV-90 Read Only System" UTS Software Solutions For Utility Customers. (No Date). (No Page Numbers or Pages).

Rappaport, T. S., "Wireless Communications, Principles and Practice," Prentice Hall PTR, 1996, pp. 410-413.

Brochure: TRF6900 Single-Chip RF Transceiver, Texas Instrument, 2001 ©.

Corcoran, P.M. et al., "CEBus Network Access via the World-Wide-Web", International Conference on Consumer Electronics, Jun. 5-7, 1996, 236-237, XP-002218722.

Corcoran, P.M. et al., "Browser-Style Interfaces to a Home Automation Network", IEEE Trans. On Consumer Electronics, Nov. 1, 1997, 43(4), 1063-1069, XP-000768559.

Chlamtac, I. et al., "Optimizing the System of Virtual Paths", IEEE ACM Transactions on Networking, 1994, 2(6), 581-586.

Leung, V.C.M., "Internetworking Wireless Terminals to Local Area Networks Via Radio Bridges", ICWC, 1992, 126-129.

Pollini, G.P. et al., "Path Optimization Procedures for Efficient Routing of Information after an Inter-Switch Handover", IEEE, 1994, 1-5.

Rajagopalan, B. et al., "A New Responsive Distributed Shortest-Path Routing Algorithm", ACM, 1989, 237-246.

Norenkov, et al., Telecommunication Technologies and Networks, Moscow Bauman Technical School, 1988, (Signed for publication on Dec. 10, 1997), pp. 116-118, 80-87 [1] English Language Abstract Provided.

Brownrigg, E. Ph.D., "Developing the Information Superhighway Issues for Libraries", Library Perspectives on NREN, The National Research and Education Network, 1990, 55-63.

Brownrigg, E.B., "The Internet as an External Economy: The Emergence of the Invisible Hand", Library Administration and Management, 1991, 95-97.

Frankel, M.S., "Packet Radios Provide Link for Distributed, Survivable C3 in Post-Attack Scenarios", MSN, Jun. 1983, 80-108.

Gower, N. et al., "Congestion Control Using Pacing in a Packet Radio Network", IEEE Military Communications Conference, 1982, 1, 23.1-1,23-1-6.

Johnson, D.B., "Routing in Ad Hoc Networks of Mobile Hosts", IEEE, 1995, 158-163.

Jubin, J., "Current Packet Radio Networks Protocols", IEEE Infocom Proceedings, 1985, 86-92.

Jubin, J. et al., "The DARPA Packet Radio Network Protocols", Proceedings of the IEEE, 1987, 75(1), 21-32.

Kahn, R.E., "The Organization of Computer Resources into a Packet Radio Network", IEEE Transactions on Communications, 1977, 25(1), 169-178.

Kahn, R.E., et al., "Advances in Packet Radio Technology", proceedings of the IEEE, 1978, 66(11), 1468-1496.

Lauer, G. et al., "Survivable Protocols for Large Scale Packet Radio Networks", IEEE Global Telecommunications Conference, 1984, 468-471.

Lynch, C.A. et al., "Electronic Publishing, Electronic Imaging, and Document Delivery", Electronic Imaging, International Electronic Imaging Exposition & Conference, 1986, 662-667.

Lynch, C.A. et al., "The Telecommunications Landscape", 1986, 7 pages.

Lynch, C.A. et al., "Routing, Repeating, Power Control and Directional Techniques", Packet Radio Networks, Architectures, Protocols, Technologies and Applications, 1987, Ch 5, 105-129, 259-274.

MacGregor, W. et al., "Multiple Control Stations in Packet Radio Networks", IEEE Military Communications Conference, 1982, 10.3-1-10.3-5.

Shachan, N. et al., "A Packet Radio Network for Library Automation", IEEE Military Communications Conference, 1987, 2, 21.3.1-21.3.7.

Shacham, N. et al., "Future Directions in Packet Radio Technology", IEEE Infocom Proceedings, 1985, 93-98.

Westcott, J.A., "Issues in Distributed Routing for Mobile Packet Radio Networks", IEEE, 1982, 233-238.

Westcott, J. et al., "A Distributed Routing Design for a Broadcast Environment", IEEE Military Communications Conference, 1982, 10.4-1-10.4-5.

"Packet Radio: Applications for Libraries in Developing Countries", UDT Series on Data Communication Technologies and Standards for Libraries, 1993, Ch 1-6, 87 pages.

* cited by examiner

```
digraph G {
 overlap=false
 maxiter=10000
"211" [style=filled, label="coll-6519"];
"8" [label="4380755"];
8 -> 211 [color=grey,label=" 56%"];
"9" [label="4380654"];
9 -> 8 [color=red,label=" 26%"];
"329" [label="4385981"];
329 -> 211 [color=grey,label=" 91%"];
"333" [label="4385977"];
333 -> 328 [color=red,label=" 80%"];
"331" [label="4385983"];
331 -> 211 [color=grey,label=" 90%"];
"328" [label="4385980"];
328 -> 211 [color=grey,label=" 76%"];
}
```

SYSTEM AND METHOD OF VISUALIZING NETWORK LAYOUT AND PERFORMANCE CHARACTERISTICS IN A WIRELESS NETWORK

FIELD OF THE INVENTION

The present invention relates to wireless networks for collecting data, and more particularly, to systems and methods of visualizing fixed wireless network layouts and performance characteristics for such networks.

BACKGROUND OF THE INVENTION

The collection of meter data from electrical energy, water, and gas meters has traditionally been performed by human meter-readers. The meter-reader travels to the meter location, which is frequently on the customer's premises, visually inspects the meter, and records the reading. The meter-reader may be prevented from gaining access to the meter as a result of inclement weather or, where the meter is located within the customer's premises, due to an absentee customer. This methodology of meter data collection is labor intensive, prone to human error, and often results in stale and inflexible metering data.

Some meters have been enhanced to include a one-way radio transmitter for transmitting metering data to a receiving device. A person collecting meter data that is equipped with an appropriate radio receiver need only come into proximity with a meter to read the meter data and need not visually inspect the meter. Thus, a meter-reader may walk or drive by a meter location to take a meter reading. While this represents an improvement over visiting and visually inspecting each meter, it still requires human involvement in the process.

An automated means for collecting meter data involves a fixed wireless network. Devices such as, for example, repeaters and gateways are permanently affixed on rooftops and pole-tops and strategically positioned to receive data from enhanced meters fitted with radio-transmitters. Typically, these transmitters operate in the 902–928 MHz range and employ Frequency Hopping Spread Spectrum (FHSS) technology to spread the transmitted energy over a large portion of the available bandwidth.

Data is transmitted from the meters to the repeaters and gateways and ultimately communicated to a central location. While fixed wireless networks greatly reduce human involvement in the process of meter reading, such systems require the installation and maintenance of a fixed network of repeaters, gateways, and servers. Identifying an acceptable location for a repeater or server and physically placing the device in the desired location on top of a building or utility pole is a tedious and labor-intensive operation. Furthermore, each meter that is installed in the network needs to be manually configured to communicate with a particular portion of the established network. When a portion of the network fails to operate as intended, human intervention is typically required to test the effected components and reconfigure the network to return it to operation.

Thus, while existing fixed wireless systems have reduced the need for human involvement in the daily collection of meter data, such systems require substantial human investment in planning, installation, and maintenance and are relatively inflexible and difficult to manage. Therefore, there is a need for a system to visually illustrate the wireless network layout and provide performance characteristics to simplify the maintenance of such systems.

SUMMARY OF THE INVENTION

The present invention is directed to methods and systems of providing a visualization of a wireless network layout as well as performance characteristics of the network. In accordance with an aspect of the invention, there is provided a wireless network and management system to provide a graphical view of a network layout. The system includes a local area network comprising wireless nodes, a data collection server that receives operational data from at least one of the wireless nodes, and a network management system that maintains a database of states of the wireless nodes. Changes in state of the wireless nodes are received by the data collection server and forwarded to the network management system. The network management system provides reports on the wireless network based on the state information stored therein.

In accordance to a feature of the invention, the database maintained by the network management system may include a current network state database and a historical network state database. The network management system may include a user interface for receiving requests and a graph rendering tool that receives the requests and renders a graphical view of the network layout. The network management system may retrieve network state information from the historical network state database to produce the graphical view. In addition, the graphical view may be configurable via the user interface to visually identify predetermined performance parameters. Further, the graph rendering tool may operate independent of the user interface and produce the graphical view in response to network state changes, and the network management system may store the graphical view until requested.

In accordance with another aspect of the present invention, there is provided a system for providing a graphical view of a network layout. The system includes a data collection server that receives operational data from wireless nodes, a network management system that maintains a database of states of the wireless nodes, and a graph rendering tool that renders a graphical view of the network layout in accordance with the states of the wireless nodes.

In accordance with another aspect of the present invention, there is provided a method for providing a graphical view of a network layout. The method includes receiving operational data from wireless nodes; maintaining a database of states of the wireless nodes in accordance with the operational data; and rendering a graphical view of the network layout in accordance with the states of the wireless nodes.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1–6. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate with each other. A collector is operable to automatically identify and register meters for communication with the collector. When a meter is installed, the meter becomes registered with the collector that can provide a communication path to the meter. The collectors receive and compile metering data from a plurality of meter devices via wireless communications. A communications server communicates with the collectors to retrieve the compiled meter data.

Figure 1:
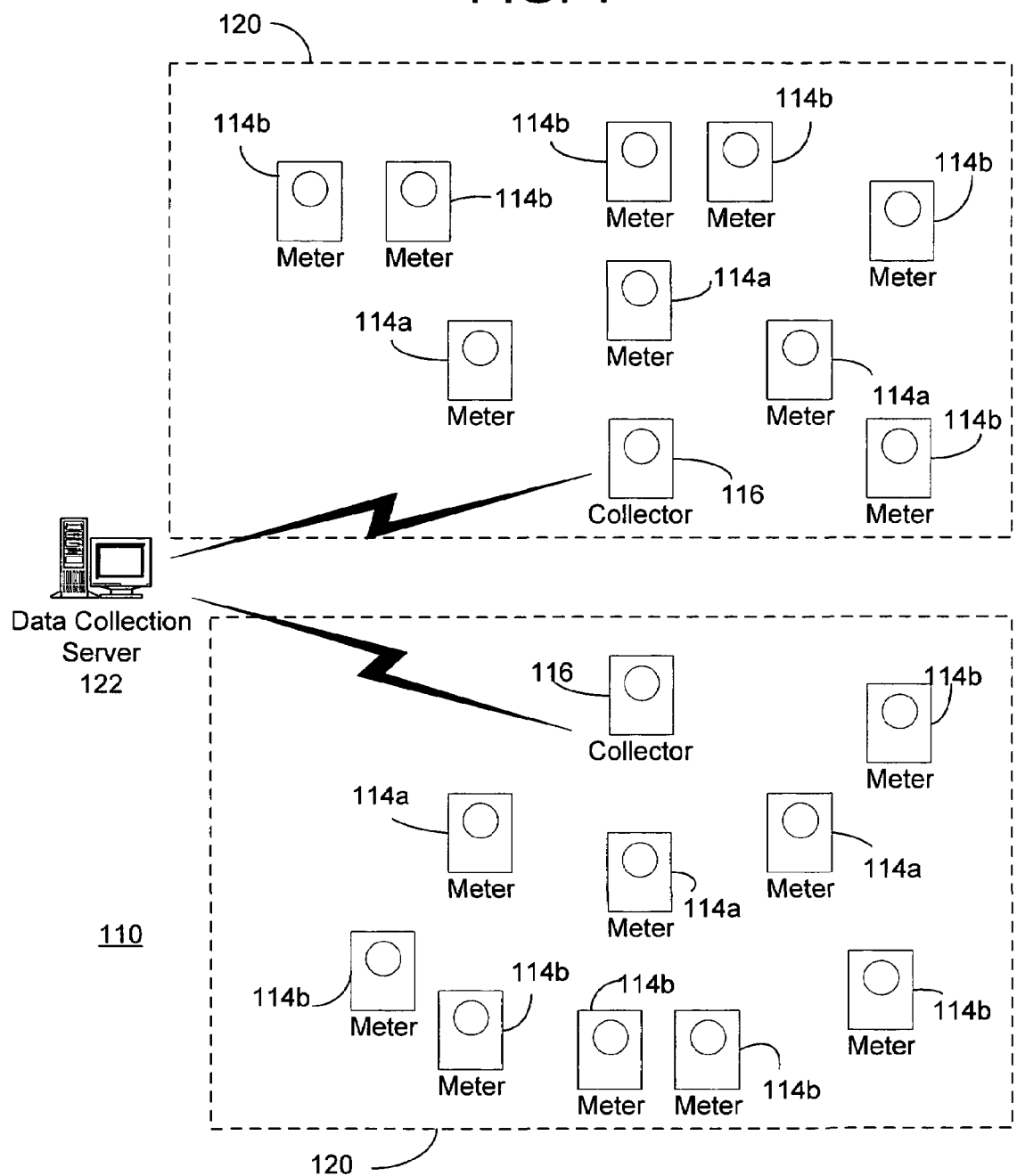
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 comprise an antenna and are operable to transmit data, including service usage data, wirelessly. Meters 114 may be further operable to receive data wirelessly as well. In an illustrative embodiment, meters 114 may be, for example, a electrical meters manufactured by Elster Electricity, LLC.

System 110 further comprises collectors 116. Collectors 116 are also meters operable to detect and record usage of a service or commodity such as, for example, electricity, water, or gas. Collectors 116 comprise an antenna and are operable to send and receive data wirelessly. In particular, collectors 116 are operable to send data to and receive data from meters 114. In an illustrative embodiment, meters 114 may be, for example, an electrical meter manufactured by Elster Electricity, LLC.

A collector 116 and the meters 114 for which it is configured to receive meter data define a subnet 120 of system 110. For each subnet 120, data is collected at collector 116 and periodically transmitted to a data collection server 122. The data collection server 122 stores the data for analysis and preparation of bills. The data collection server 122 may be a specially programmed general purpose computing system and may communicate with collectors 116 wirelessly or via a wire line connection such as, for example, a dial-up telephone connection or fixed wire network.

Generally, collector 116 and meters 114 communicate with and amongst one another using any one of several robust wireless techniques such as, for example, frequency hopping spread spectrum (FHSS) and direct sequence spread spectrum (DSSS).

Figure 2:
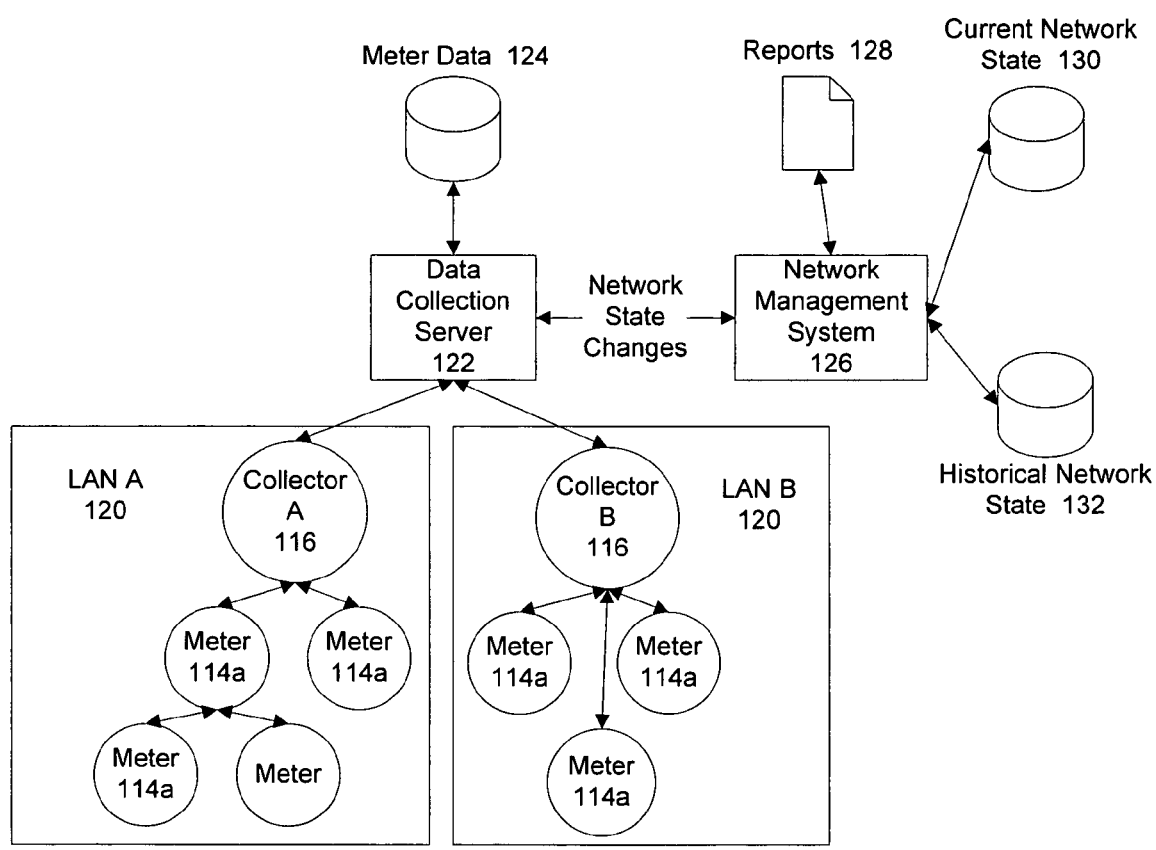
FIG. 2 expands upon the diagram of FIG. 1 and illustrates a system in which the present invention is embodied.

Referring now to FIG. 2, there is illustrated a system in which the present invention may be embodied. As the data collection server 122 collects metered and operational data from multiple collectors 116, changes in network state such as new nodes registering, nodes unregistering, node paths changing, etc., in a collector's LAN are detected by the server 122 and forwarded to a Network Management System (NMS) 126. The NMS 126 maintains a database describing the current state of the global fixed network system (current network state 130), and a database describing the historical state of the system (historical network state 132). The historical network state 132 is a database from which the state of the network at a particular point in the past can be reconstructed. The NMS 126 is responsible for, amongst other things, providing reports about the state of the network.

Figure 3:
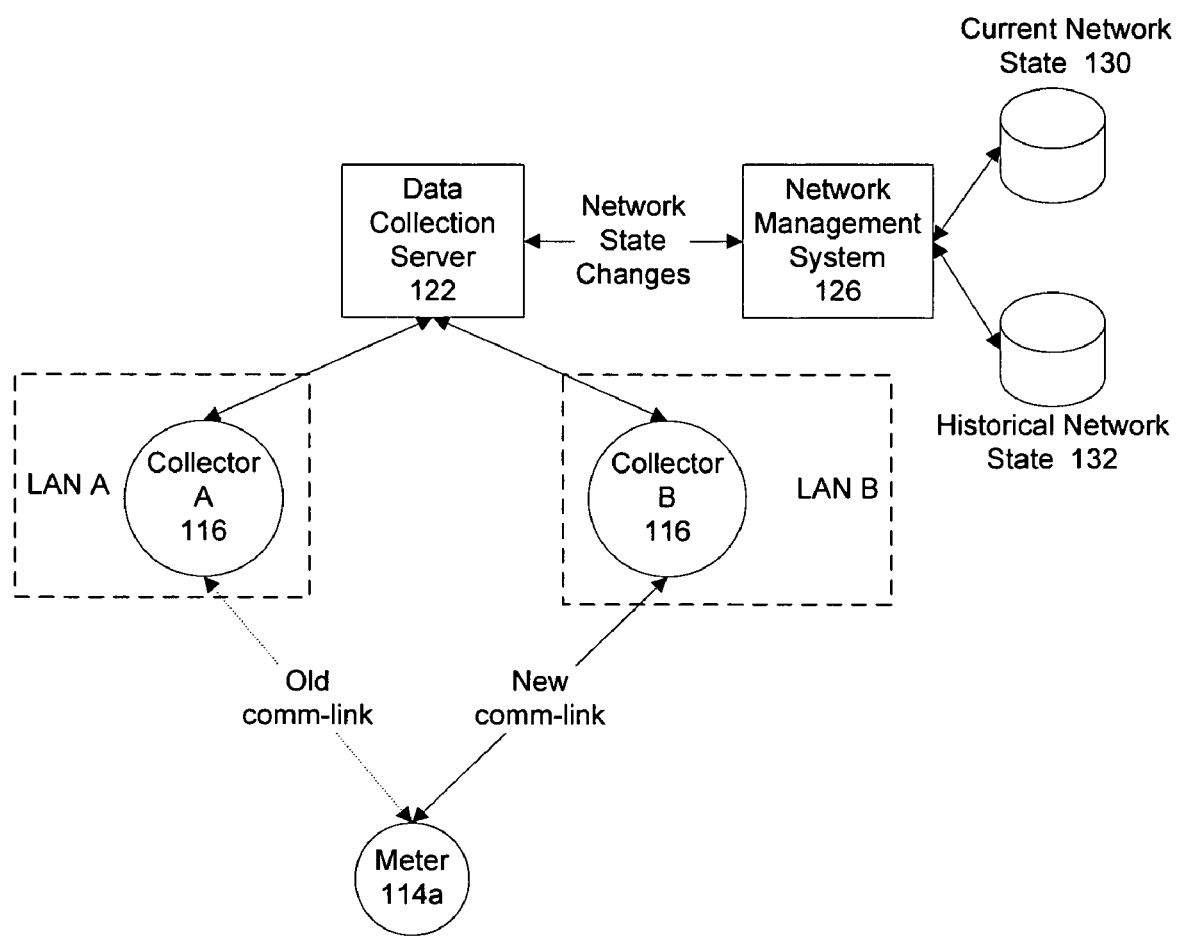
FIG. 3 illustrates an exemplary sequence of events resulting from a change in network state.

An exemplary sequence of events resulting from a change in network state will now be explained with reference to FIG. 3. Initially, the meter 114a changes from collector A to collector B. Next, the data collection server 122 detects the change in the communication path of meter 114a from LAN A to LAN B. The data collection server 122 then sends network state updates to the network management system 126. The network management system 126 then updates the current network configuration 130 and the historical network configuration 132 to reflect the change. This exemplary sequence of events causes the NMS 126 to update both historical and current network state databases. These operations are preferably automatic and require no user intervention. In this way, the system maintains a substantially up to date description of the state of the fixed network of meters that it is responsible for managing.

Figure 4:
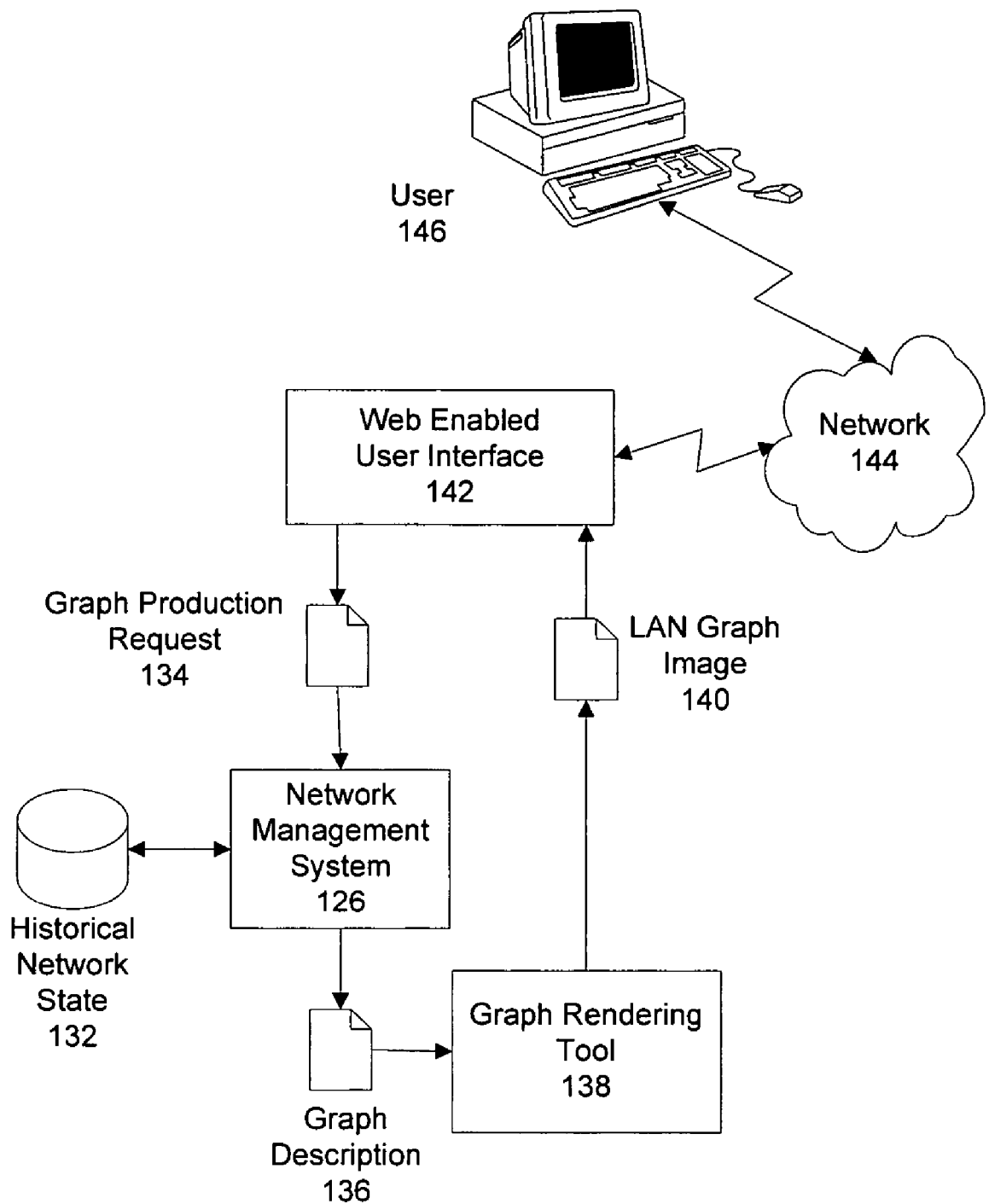
FIG. 4 shows the process of producing a graphical diagram of the network layout.

The invention further produces graphs (diagrams) of a particular set of wireless devices (e.g., meters registered to a particular collector), where the set of wireless devices may be defined according to user-specified parameters. FIG. 4 illustrates the process of producing the diagram. Initially, a request 134 comes from a user interface 142 containing a collector ID and graph parameters. The user interface 142 may comprise a browser-based interface that may be accessed via a web browser such as Internet Explorer available from MICROSOFT.

The network management system 126 retrieves network state information, performance information, meter characteristics, etc., from the historical network state database 132 as needed to fulfill the request 134. The network management system 126 produces a graph description 136, including all edges, vertices, labels, and other information required to produce the graph.

The graph description 136 is in a language that can be rendered into an image by a graph rendering tool 138. An exemplary graph rendering tool is the DOT or NEATO software, both of which are part of the Graphviz package available from AT&T Research. These tools consume a text file containing the graph description in the "DOT language," and produce an image of the graph. The graph is laid out in the image according to a variety of customizable rules. It is preferable that the image output (LAN graph image 140) is in the Scalable Vector Graphic (SVG) format, which is itself a text file that can be rendered into an on-screen image by a web browser (or standalone viewer). Alternatively, the output format may be any image file, such as JPG, GIF, bitmap, etc. The graph rendering tool 138 outputs the rendered LAN graph image 140 (e.g., an SVG file), that is returned to the user interface layer 142, to be displayed to the user in, for example, the web browser.

Users 146 may select, via the interface 142: nodes falling below a predetermined performance percentage, nodes that have changed their network registration more than a predetermined number of times within a specified time frame, nodes having a percentage of the network registered beneath them, etc. Also, in accordance with the present invention, the LAN graph image 140 is produced as needed, but may also be produced in response to network state changes and stored (cached) until needed. This approach is preferred because of its increased performance as the graph layout step is computationally expensive for large graphs.

Figures 5, 6:
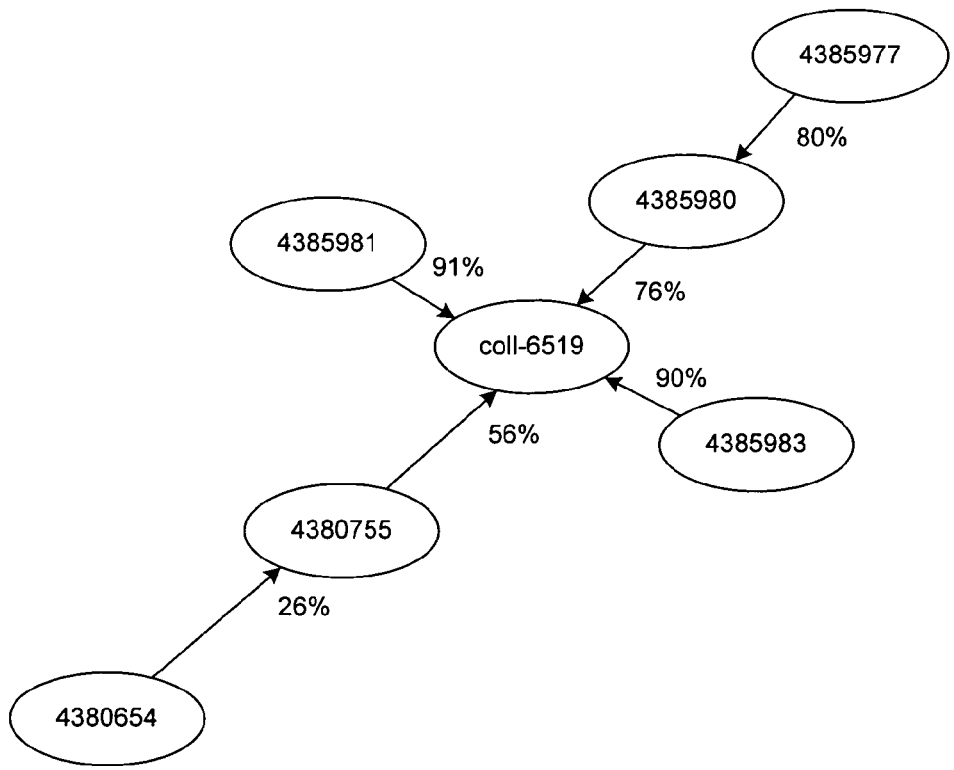
FIG. 5 illustrates an exemplary text input file for a graph rendering tool.
FIG. 6 illustrates an exemplary output graph diagram based on the input file of FIG. 5.

An exemplary graph description file is shown in FIG. 5, which is a text file in the format required by the DOT tool from the Graphviz package. The DOT language file describes edges, vertices, and labels that make up a graph describing the relationship between the meters that will appear in an output graph diagram. An exemplary output graph diagram is shown in FIG. 6, wherein vertices in the graph represent meters, and edges represent communication paths between meters and repeaters or between meters and collectors or between repeaters and collectors. FIG. 6 further illustrates a reading performance (as a percentage or other metric) between the meter and the collector. The reading performance may include or ignore retries. The edge length can be scaled according to the reading performance to make poor performing nodes appear farther from the collector. In addition, color coding may be used to indicate various parameters of importance.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed:

1. A system comprising:
   a wireless network comprising a collector and a plurality of meters that communicate wirelessly with the collector, each of the meters having a wireless communication path to the collector that is either a direct path or an indirect path through one or more intermediate meters that serve as repeaters, the wireless communication paths between each meter and the collector defining a layout of the network;
   a data collection server that receives from the collector operational data concerning the collector and each of the meters; and
   a network management system that maintains a database of states of the collector and the meters,
   wherein state changes of the collector and the meters are received by said data collection server and forwarded to said network management system, and wherein said network management system provides reports on said wireless network in accordance with said state changes.

2. The system of claim 1, wherein said database maintained by said network management system comprises a current network state database and a historical network state database.

3. The system of claim 2, said network management system comprising:
   a user interface for receiving requests; and
   a graph rendering tool that receives said requests and renders a graphical view of said network layout.

4. The system of claim 3, wherein said network management system retrieves network state information from said historical network state database to produce said graphical view.

5. The system of claim 3, wherein said graphical view is configurable via said user interface to visually identify predetermined performance parameters.

6. The system of claim 3, wherein said graph rendering tool operates independent of said user interface and produce said graphical view in response to said state changes, and
   wherein said network management system stores said graphical view until requested.

7. The system of claim 5, wherein the predetermined performance parameters include a reading performance between each meter and the collector.

8. A system for providing a graphical view of a network layout, comprising:
   a data collection server that receives operational data from a wireless network that comprises a collector and a plurality of meters that communicate wirelessly with the collector, each of the meters having a wireless communication path to the collector that is either a direct path or an indirect path through one or more intermediate meters that serve as repeaters, the wireless communication paths between each meter and the collector defining a layout of the network;
   a network management system that maintains a database of states of the collector and the meters; and
   a graph rendering tool that renders a graphical view of said network layout in accordance with said states of the collector and the meters,
   wherein state changes of the collector and the meters are received by said data collection server and forwarded to said network management system, and wherein said network management system provides reports on said network layout in accordance with said state changes.

9. The system of claim 8, wherein said database maintained by said network management system comprises a current network state database and a historical network state database.

10. The system of claim 9, said network management system further comprising a user interface for receiving requests for said graphical view.

11. The system of claim 10, wherein said network management system retrieves network state information from said historical network state database to produce said graphical view.

12. The system of claim 10, wherein said graphical view is configurable via said user interface to visually identify predetermined performance parameters.

13. The system of claim 10, wherein said graph rendering tool operates independent of said user interface and produce said graphical view in response to said state changes, and
    wherein said network management system stores said graphical view until requested.

14. The system of claim 12, wherein the predetermined performance parameters include a reading performance between each meter and the collector.

15. A method for providing a graphical view of a network layout, comprising:
    receiving operational data from a wireless network that comprises a collector and a plurality of meters that communicate wirelessly with the collector, each of the meters having a wireless communication path to the collector that is either a direct path or an indirect path through one or more intermediate meters that serve as repeaters, the wireless communication paths between each meter and the collector defining a layout of the network;

maintaining a database of states of the collector and the meters in accordance with said operational data; and rendering a graphical view of said network layout in accordance with said states of the collector and the meters.

16. The method of claim 15, wherein maintaining said database includes maintaining a current network state database and a historical network state database.

17. The method of claim 16, further comprising:

retrieving network state information from said historical network state database; and producing said graphical view.

18. The method of claim 15, further comprising configuring said graphical view via a user interface to visually identify predetermined performance parameters.

19. The method of claim 15, further comprising:

automatically producing said graphical view in response to state changes; and storing said graphical view until requested.

20. The method of claim 18, wherein the predetermined performance parameters include a reading performance between each meter and the collector.

* * * * *